(12) United States Patent
Kuroda

(10) Patent No.: US 11,531,285 B2
(45) Date of Patent: Dec. 20, 2022

(54) CHARGING ROLLER WITH POLYROTAXANE

(71) Applicant: Hewlett-Packard Development Company, L.P., Spring, TX (US)

(72) Inventor: Noriaki Kuroda, Yokohama (JP)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/414,145

(22) PCT Filed: Jul. 17, 2020

(86) PCT No.: PCT/US2020/042561
§ 371 (c)(1),
(2) Date: Jun. 15, 2021

(87) PCT Pub. No.: WO2021/016088
PCT Pub. Date: Jan. 28, 2021

(65) Prior Publication Data
US 2022/0137527 A1  May 5, 2022

(30) Foreign Application Priority Data
Jul. 24, 2019 (JP) .............................. JP2019-136200

(51) Int. Cl.
*G03G 15/02* (2006.01)

(52) U.S. Cl.
CPC ................... *G03G 15/0233* (2013.01)

(58) Field of Classification Search
CPC .......................... G03G 15/00; G03G 15/0233
USPC .......................................... 399/168, 174, 176
See application file for complete search history.

(56) References Cited

U.S. PATENT DOCUMENTS

| 9,939,746 | B2 | 4/2018 | Arimura et al. |
| 2013/0223886 | A1 | 8/2013 | Miyagawa et al. |
| 2013/0251403 | A1 | 9/2013 | Matsuda et al. |

FOREIGN PATENT DOCUMENTS

| JP | 2008180882 A | 8/2008 | |
| JP | 2012181244 A | 9/2012 | |
| JP | 2016114685 A | 6/2016 | |
| WO | WO-2013094129 A1 * | 6/2013 | ........... G03G 13/025 |
| WO | WO-2019066186 A1 | 4/2019 | |

* cited by examiner

*Primary Examiner* — Hoan H Tran
(74) *Attorney, Agent, or Firm* — Staas & Halsey LLP

(57) ABSTRACT

A charging roller includes a conductive support, and a roller body to rotate about the conductive support. The roller body includes a conductive elastic layer to contact the conductive support, and a conductive resin layer located around the conductive elastic layer to form a surface of the roller body. The surface has ten-point average roughness Rzjis of approximately 20 μm to 30 μm. The conductive resin layer contains polyrotaxane.

15 Claims, 4 Drawing Sheets

CHARGING ROLLER WITH POLYROTAXANE

BACKGROUND

Some image forming apparatuses include a photoreceptor, a charging device, an exposure device which forms an electrostatic latent image on the photoreceptor, a development device which applies a toner onto the electrostatic latent image to develop a toner image, and a transfer device to transfer the toner image formed on the photoreceptor to a transfer material. The charging device includes a charging roller which charges the photoreceptor.

DETAILED DESCRIPTION

In the following description, with reference to the drawings, the same reference numbers are assigned to the same components or to similar components having the same function, and overlapping description is omitted. In addition, the dimensional ratio of each constituent is not limited to the illustrated ratio.

Charging Roller and Imaging Apparatus

Figure 1:
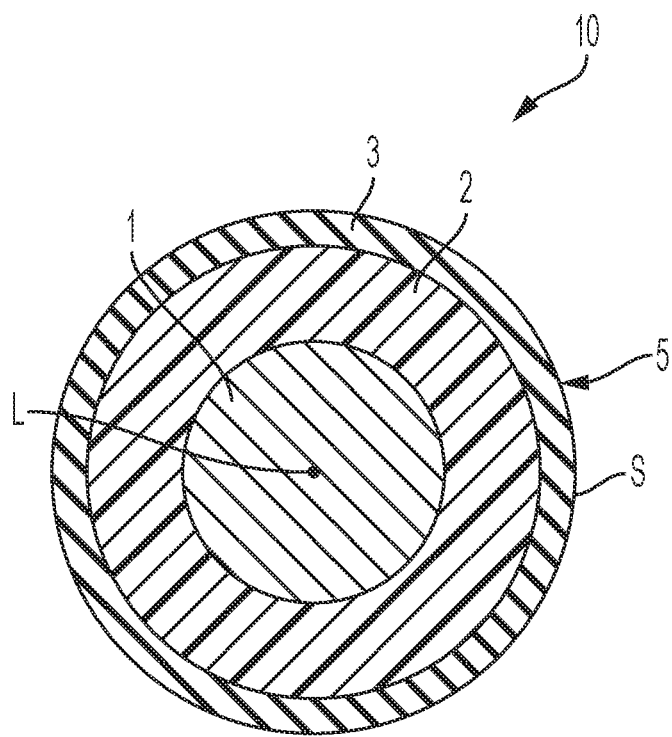
FIG. 1 is a schematic cross-sectional view of an example charging roller.

With reference to FIG. 1, an example charging roller 10 includes a roller body 5. The roller body 5 is in the shape of a roller to rotate about a rotation axis line (or rotational axis) L. The roller body 5 is rotationally symmetric about the rotation axis line L. The charging roller 10 includes a conductive support 1 that extends along the rotation axis to form a rotation axle for the roller body 5. Accordingly, the roller body 5 rotates about the rotation axis line L of the conductive support 1.

The example roller body 5 may include a conductive elastic layer 2 located around the conductive support 1, and a conductive resin layer 3 located around the conductive elastic layer 2. The conductive elastic layer 2 may be in contact with an outer circumferential surface of the conductive support 1. In some examples, the conductive resin layer 3 may be arranged to contact an outer circumferential surface of the conductive elastic layer 2, or may be located around the conductive elastic layer 2 with another layer positioned between the conductive resin layer 3 and the conductive elastic layer 2. For example, an intermediate layer for increasing voltage resistance (leakage resistance), such as a resistance adjustment layer, may be interposed between the conductive elastic layer 2 and the conductive resin layer 3.

Conductive Support

The conductive support 1 may be formed of a metal having conductivity. The conductive support 1, for example, may be hollow body (for example, a pipe or a substantially circular tube), a solid body (for example, a rod), or the like that is formed of metal including iron, copper, aluminum, nickel, stainless steel, and the like. The outer circumferential surface of the conductive support 1 may be subjected to a plating treatment, as necessary, in order to impart rustproof or scratch resistance to the extent that the conductivity is not impaired. In addition, the outer circumferential surface of the conductive support 1 may be coated with a suitable adhesive agent, primer, or the like, in order to increase adhesiveness with respect to the conductive elastic layer 2. In this case, the adhesive agent, the primer, or the like may have a suitable conductivity property to impart the conductive support 1 with sufficient conductivity.

The conductive support 1, for example, may be in the shape of a cylinder having a length of 250 mm to 360 mm. A portion of the conductive support 1 that is covered with the conductive elastic layer 2, for example, is formed into the shape of a cylinder or a circular tube that extends along the rotation axis line L direction of the conductive support 1 (a longitudinal direction of the conductive support 1), and may have a diameter (e.g., an outer diameter) that is constant in the direction of the rotation axis line L (in the shape of a straight cylinder or a straight circular tube). The diameter of the portion of the conductive support 1 that is covered with the conductive elastic layer 2, for example, may be 8 mm or more, or may be 10 mm or less.

The conductive support 1 may include one or more portion that are not be covered with the conductive elastic layer 2. For example, the end portions of the conductive support 1 may not be covered and may be supported by a support member. The diameter of the portions of the conductive support 1 that are not covered with the conductive elastic layer 2, for example, may be less than the diameter of the portion that is covered with the conductive elastic layer 2. The conductive support 1 rotates about the rotation axis line (a center line of a cylinder) L of the conductive support 1, in a state of being supported on the support member.

The conductive support 1 may be biased toward a photoreceptor such that the surface of the conductive resin layer 3 is in contact with the surface of the photoreceptor. For example, in order to push or urge the surface of the conductive resin layer 3 against the surface of the photoreceptor, loads may be applied to the two end portions of the conductive support 1, respectively, toward the photoreceptor. To provide a suitable contact between the charging roller 10 and the rotating photoreceptor, a load may be applied to the end portion of the conductive support 1 on one side, for example. The load may be 450 g to 750 g.

Conductive Elastic Layer

The conductive elastic layer 2 may be imparted with a suitable elasticity to ensure a uniform cohesiveness with the photoreceptor. The conductive elastic layer 2, for example, may be formed of a base polymer including: natural rubber; synthetic rubber such as ethylene-propylene-diene rubber (EPDM), styrene-butadiene rubber (SBR), silicone rubber, a polyurethane-based elastomer, epichlorohydrin rubber, isoprene rubber (IR), butadiene rubber (BR), acrylonitrile-butadiene rubber (NBR), hydrogenated NBR (H-NBR), and chloroprene rubber (CR); a synthetic resin such as a polyimide resin, a polyurethane resin, and a silicone resin; and/or the like. In some examples, a single type of the materials may be used, or in other examples, two or more types thereof may be used in combination.

In the base polymer, known additives such as a conductive agent, a vulcanizing agent, a vulcanization promoter, a lubricant, and an auxiliary agent may be suitably compounded, as necessary, in order to impart targeted properties to the conductive elastic layer 2. In some examples, the conductive elastic layer 2 may contain epichlorohydrin rubber as a main component to provide a more stable resistance. For example, the conductive elastic layer 2 may contain 50 mass % or more of epichlorohydrin rubber, or may contain 80 mass % or more of epichlorohydrin rubber.

The conductive agent may include carbon black, graphite, potassium titanate, iron oxide, conductive titanium oxide (c-$TiO_2$), conductive zinc oxide (c-ZnO), conductive tin oxide (c-$SnO_2$), quaternary ammonium salt, and/or the like. The vulcanizing agent may include sulfur and the like. The vulcanization promoter may include tetramethyl thiuram disulfide (CZ) and the like. The lubricant may include a stearic acid and the like. The auxiliary agent may include Zinc flower (ZnO) and the like.

The thickness of the conductive elastic layer 2, for example, may be 1.25 mm to 3.00 mm, to exhibit suitable elasticity.

Conductive Resin Layer

Figure 2:
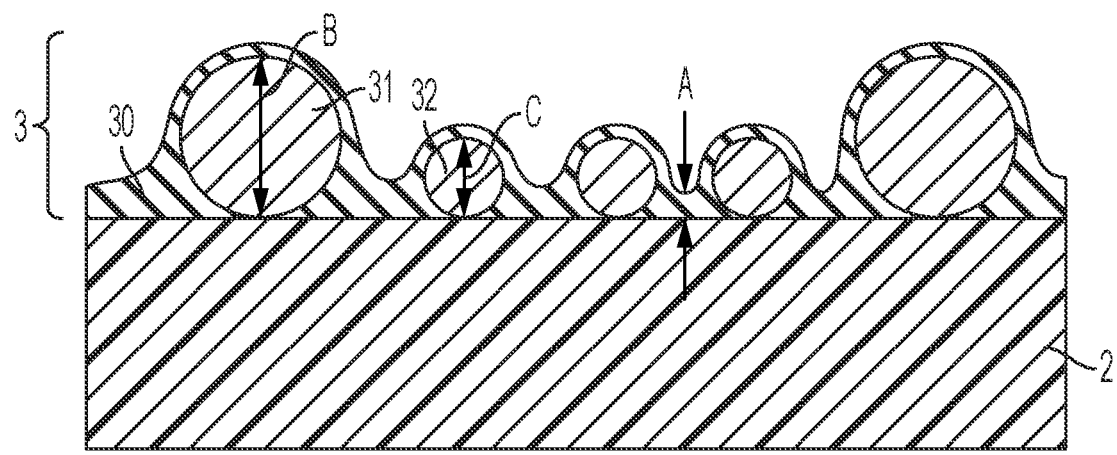
FIG. 2 is a schematic partial cross-sectional view of an example conductive resin surface layer of the charging roller of FIG. 1.

With further reference to FIG. 2, the example conductive resin layer 3 is provided as the outermost layer of the roller body 5, and forms the surface of the roller body 5. The conductive resin layer 3, for example, may further contain a material to configure or form a matrix (a matrix material) 30, and particles dispersed in the material.

The matrix material 30 is configured of a material that does not contaminate the photoreceptor which is a charged body. The matrix material 30, for example, may contain a base polymer and polyrotaxane. Furthermore, the polyrotaxane is not included in the base polymer.

In some examples, the base polymer may include a polymer such as a fluorine resin, a polyamide resin, an acrylic resin, a nylon resin, a polyurethane resin, a silicone resin, a butyral resin, a styrene-ethylene.butylene-olefin copolymer (SEBC), and/or an olefin-ethylene.butylene-olefin copolymer (CEBC). In some examples, a single type of the materials may be used, or in other examples, two or more types thereof may be used in combination. For example, to improve ease of handling, and/or the size of a freedom degree of material design, or the like, the base polymer may include at least one type selected from the group consisting of a fluorine resin, an acrylic resin, a nylon resin, a polyurethane resin, and a silicone resin in some examples, or may be at least one type selected from the group consisting of a nylon resin and a polyurethane resin in other examples.

The content of the base polymer in the conductive resin layer, for example, may be 30 to 90 mass %, relative to the total amount or mass of the conductive resin layer.

The polyrotaxane, for example, may include a plurality of cyclic molecules, chain molecules extending to penetrate through the rings of the plurality of cyclic molecules, and enclosing groups (blocking groups) that are respectively bonded to both terminals of the chain molecules and prevent the desorption of the cyclic molecules from the chain molecules. The cyclic molecules, for example, may be cyclodextrin. The chain molecules, for example, may be molecules derived from polyalkylene glycol such as polyethylene glycol. The enclosing groups, for example, may be groups derived from adamantine amine.

The conductive resin layer 3 may contain the polyrotaxane, to suppress rotation unevenness (a circumferential speed deviation) of the charging roller 10. It is assumed that this is because the conductive resin layer 3 is capable of absorbing vibration energy by a viscosity effect due to the sliding of the cyclic molecules in the polyrotaxane.

In some examples, the content of the polyrotaxane in the conductive resin layer is relatively high, to further reduce or suppress the rotation unevenness (the circumferential speed deviation) of the charging roller 10, and to reduce or suppress the roughness in an image to be obtained. For example, the conductive resin layer may have a polyrotaxane content of 1 mass % or more in some examples, of 2 mass % or in other examples, of 3 mass % or more in other examples, or of 4 mass % or more in yet other examples. In some examples, the content of the polyrotaxane in the conductive resin layer is relatively low in order to reduce or suppress surface contamination of the conductive resin layer 3. For example, the conductive resin layer may have a polyrotaxane content of 10 mass % or less in some examples, of 9 mass % or less in other examples, of 8 mass % or less in other examples, or 7 mass % or less in yet other examples.

The matrix material 30, for example, may further contain various conductive agents (e.g., conductive carbon, graphite, copper, aluminum, nickel, iron powder, conductive tin oxide, conductive titanium oxide, an ion conductive agent, and the like), a charging control agent, and the like.

The particles dispersed in the matrix material 30 may include first particles 31 and second particles 32, in which the first particles 31 and the second particles 32 have different types. The first particles 31 may include first resin particles or first inorganic particles. The second particles 32 may include second resin particles or second inorganic particles. In some examples, the conductive resin layer 3 may further contain the matrix material 30, and two different types of particles 31 and 32, in addition to the polyrotaxane. Here, different types may be associated to different shapes and the like. For example, even in a case where the material of the first particles 31 is identical to the material of the second particles 32, the first particles 31 and the second particles 32 may be of different types where they have different shapes.

In some examples, the first particles 31 and the second particles 32 may be insulating particles. The first particles 31 and the second particles 32 may be constituted of the resin particles or the inorganic particles, and may be capable of forming irregularity on the surface of the conductive resin layer in order to sufficiently ensure a discharge point. In some examples, a urethane resin, a polyimide resin, a fluorine resin, a nylon resin, an acrylic resin, a urea resin, and the like may be used as the material of the resin particles. A single type of the materials may be used according to some examples, or in other examples, two or more types thereof may be used in combination. In a case where the first resin particles are used as the first particles 31, the first resin particles may be any one of nylon-based particles, urethane-based particles, and acrylic particles, for better compatibility with the matrix material 30, for improved dispersion retainability after the particles are added, for improved stability after coating (a pot life), or the like. Similarly, in a case where the second resin particles are used as the second particles 32, the second resin particles may be any one of nylon-based particles, urethane-based particles, and acrylic particles.

The shape of the first particles 31 and the second particles 32, for example, is a shape in which irregularity can be formed with respect to the surface of the conductive resin layer 3. The shape of the first particles 31 and the second particles 32, for example, may be a spherical shape and an oval spherical shape, an amorphous shape, and the like. The first particles 31 and/or the second particles 32 may have an amorphous shape to suppress or inhibit the dropout of the first particles 31 and the second particles 32.

The total amount or content of the first particles 31 and the second particles 32 in the conductive resin layer 3 may be of 10 mass % to 70 mass %, relative to the total amount or mass of the conductive resin layer.

With reference to FIG. 2, the conductive resin layer 3, for example, contains the particles described above, and thus, has an irregular shape on the surface. In the conductive resin layer 3, a portion containing neither the first particles 31 nor the second particles 32 (e.g. a portion containing the matrix material 30 exclusively) may have a layer thickness A (FIG. 2) of 1.0 µm to 7.0 µm. For example, the layer thickness A is taken at a middle point between the closest particles. By setting the layer thickness A to be 1.0 µm or more, the resin particles to be added are more easily continuously inhibit dropout of the resin particles during a prolonged period of time. By setting the layer thickness A to be 7.0 µm or less, a higher charging performance is more easily maintained. The layer thickness A may be measured by cutting out a sectional surface of the roller body 5 using a sharp blade, and by observing or examining the sectional surface with an optical microscope or an electronic microscope.

The first particles 31 may have a particle diameter B of 15.0 µm to 40.0 µm, as an average particle diameter, to reduce or suppress charging unevenness which may cause imperfections in the image (e.g., an initial image defect). The second particles 32 may have a particle diameter C of 15.0 µm to 40.0 µm, as an average particle diameter, to reduce or suppress charging unevenness that may cause imperfections in the image (e.g., the initial image defect). To further inhibit charging unevenness, the average particle diameter of the first particles 31 may be greater than the average particle diameter of the second particles 32. In some examples, the average particle diameter of the first particles 31 may be greater than the average particle diameter of the second particles 32 by 10 µm or more.

The average particle diameter of the first particles 31 and the second particles 32 can be measured or derived by randomly extracting 100 particles from a plurality of particles with Scanning Electron Microscopes (SEM) observation, and by obtaining an average value of the diameters of the particles extracted. In some examples, where a particle shape is not spherical, but is a shape in which a particle size measurement is not uniformly set, such as for a spheroidal shape or an amorphous shape, the particle size may be set as an average value of the longest cross-sectional distance and the shortest cross-sectional distance.

An interparticle distance of the particles contained in the conductive resin layer 3 (for example, an interparticle distance of all of the particles including the first particles 31 and the second particles 32) may be of 50 µm to 250 µm. By setting the interparticle distance to be 50 µm or more, the surface roughness of the conductive resin layer 3 and particle dropout are more easily inhibited. By setting the interparticle distance to be 250 µm or less, the particle dropout is more easily inhibited or suppressed. Furthermore, the interparticle distance is measured based on JIS B0601-2001.

Accordingly, the example conductive resin layer 3 forms a surface of the charging roller 10 having irregularities. In some examples, the surface of the charging roller 10 has a ten-point average roughness Rzjis of 20 µm to 30 µm. By setting the ten-point average roughness Rzjis to be 20 µm or more, the charging unevenness may be reduced or suppressed. By setting the ten-point average roughness Rzjis to be 30 µm or less, the rotation unevenness (the circumferential speed deviation) of the charging roller 10 may be reduced or suppressed. The ten-point average roughness Rzjis may be of 21 µm or more in some examples, of 21.5 µm or more in other examples, of 22 µm or more in yet other examples, of 22.5 µm or more yet other examples, or of 23 µm or more in still other examples, to further reduce or suppress the charging unevenness. The ten-point average roughness Rzjis may be of 29 µm or less in some examples, of 28 µm or less in other examples, of 27.5 µm or less in other examples, of 27 µm or less in yet other examples, of 26.5 µm or less in yet other examples, or of 26 µm or less in still other examples, to further reduce or suppress the rotation unevenness (the circumferential speed deviation) of the charging roller 10.

The ten-point average roughness Rzjis of the surface of the charging roller 10 may be measured by using a surface roughness indicator SE-3400 manufactured by Kosaka Laboratory Ltd., based on JIS B0601-2001. The ten-point average roughness Rzjis (and other surface textures of the charging roller 10) may be adjusted by changing the size, the shape, the amount, and the like of the particles contained in the conductive resin layer 3.

The roller body 5 having the configuration described above may include a surface that is curved with respect to the rotation axis line L. For example, a cross-section of the roller body taken longitudinally along a plane that intersects the rotation axis line L would show that the surface of the conductive resin layer 3 is curved with respect to the rotation axis line L. The shortest distance from the rotation axis line L to the surface of the roller body 5 (the surface of the conductive resin layer 3) which corresponds substantially to a radius of the roller body 5, or to half of an outer diameter of the roller body 5, varies along the direction of the rotation axis line L. The shortest distance from the rotation axis line L to the surface of the roller body 5 reaches a maximum at a center point of the roller body 5 along the rotation axis line L (a center point of the roller body 5 in a longitudinal direction), and decreases toward the end portions of the roller body 5.

A crown amount can be used as an index expressing such a roller shape of the roller body 5. The crown amount of the roller body 5 may be defined as follows.

$$\text{Crown Amount} = D2 - (D1 + D3)/2$$

In the expression, D1 indicates the outer diameter of the roller body 5 at a position that is 30 mm away from a first end of the roller body 5 in the longitudinal direction (a rubber length) toward the center point, D2 indicates the outer diameter of the roller body 5 at the center point of the roller body 5 in the longitudinal direction (the rubber length), and D3 indicates the outer diameter of the roller body 5 in a position that is 30 mm away from a second end of the roller body 5 in the longitudinal direction (the rubber length) toward the center point.

The crown amount of the roller body 5 may be of 50 µm or more in some examples, of 60 µm or more in other examples, or of 70 µm or more in yet other examples, and may be of 130 µm or less in some examples, 120 µm or less in other examples, or 110 µm or less in yet other examples, to achieve a more stable charging evenness for a prolonged period of time while allowing the charging roller 10 to suitably contact (or cohere to) the photoreceptor, and to maintain the granularity of image quality.

The crown amount of the roller body 5 may be of 60 µm to 80 µm according to some examples, or of 65 µm to 75 µm according to other examples. In some examples, the ten-point average roughness Rzjis (µm) of the surface of the roller body 5 and a content C (mass %) of the polyrotaxane in the conductive resin layer 3 may satisfy a relationship of $C/(Rzjis)^2 \geq 0.007$, to further suppress or reduce rotation unevenness (the circumferential speed deviation) of the charging roller 10 and the roughness in the image to be obtained. For similar reasons, $C/(Rzjis)^2$ may be of 0.008 or more in some examples, of 0.009 or more in other examples, of 0.010 or more in other examples, of 0.011 or more in yet other examples, of 0.012 or more in yet other examples, or of 0.013 or more in other examples. In some examples, $C/(Rzjis)^2$, for example, may be of 0.020 or less in some examples, of 0.018 or less in other examples, or of 0.016 or less in yet other examples.

In some examples, the crown amount of the roller body 5 may be of 80 μm to 100 μm in some examples, or of 85 μm to 95 μm in other examples. In such examples, the ten-point average roughness Rzjis (μm) of the surface of the roller body 5 and the content C (mass %) of the polyrotaxane in the conductive resin layer 3 may satisfy a relationship of $C/Rzjis \geq 0.25$, to further reduce or suppress the rotation unevenness (the circumferential speed deviation) of the charging roller 10 and the roughness in the image to be obtained. For similar reasons, C/Rzjis may be of 0.26 or more in some examples, of 0.27 or more in other examples, of 0.28 or more in yet other examples, of 0.29 or more in yet other examples, or of 0.30 or more in other examples. C/Rzjis, for example, may be 0.50 or less in some examples, of 0.45 or less in other examples, or 0.40 or less in yet other examples.

The crown amount of the roller body 5 may be of 100 μm to 120 μm according to some examples, or of 105 μm to 115 μm according to other examples. In such examples, the content of the polyrotaxane in the conductive resin layer 3 may be of 7.5 mass % or more according to some examples, of 8 mass % or more according to other examples, or of 8.5 mass % or more according to yet other examples, to further reduce or suppress the rotation unevenness (the circumferential speed deviation) of the charging roller 10 and the roughness in the image to be obtained. The content of the polyrotaxane in the conductive resin layer 3 may be of 10 mass % or less according to some examples, of 9.5 mass % or less according to other examples, or of 9 mass % or less according to yet other examples.

The example charging roller 10 described above may be provided in an example image forming device that includes an image carrier as a photoreceptor, where the charging roller 10 charges the image carrier (photoreceptor). For example, the charging roller 10 may carry out a charging treatment to the surface of the image carrier. Accordingly, the example image forming device includes the photoreceptor, and the charging roller 10 to charge the photoreceptor.

In the example image forming device, a direct-current voltage may be applied to the charging roller 10. The example charging roller 10 described herein may achieve a stable and even charging level for a prolonged period of time and maintain the granularity of the image quality, even when the direct-current voltage exclusively, is applied. In some examples, a bias voltage that is applied while an image is output may be of −1000 V to −1500 V. Accordingly, the charging performance is maintained under various environments, and an image concentration or various other conditions are more easily controlled. In cases where the bias voltage is less than −1000 V (e.g., the normal value of the bias voltage is less than the normal value of −1000 V), it may be difficult to optimize a development condition for forming an image. A bias voltage that is greater than −1500 V e.g., the normal value of the bias voltage is greater than the normal value of −1500 V), may cause excessive discharge in the particle portion of the conductive resin layer, and a white point-like image defect after an image is formed.

Manufacturing Method of Charging Roller

With reference to FIG. 1, an example method of manufacturing the example charging roller 10 will be described. In some examples, the materials for the conductive elastic layer 2 are kneaded by using a kneading machine such as a kneader, to obtain a material for a conductive elastic layer. The materials for the conductive resin layer 3 are kneaded by using a kneading machine such as a roller. An organic solvent is added to the mixture. The organic solvent is mixed, and stirred, to obtain a coating liquid for a conductive resin layer. A metal mold for injection molding is provided, and a core bar that is the conductive support 1 is set in the metal mold. The metal mold is filled with the material for a conductive elastic layer, and is thermally crosslinked in a predetermined condition. Subsequently, the material is demolded, to obtain a base roller in which the conductive elastic layer 2 is formed along the outer circumferential surface of the conductive support 1. Subsequently, the coating liquid for a conductive resin layer is applied onto an outer circumferential surface of the base roller described above, to form the conductive resin layer 3. As described above, the charging roller 10 can be prepared so that the conductive elastic layer 2 is formed on the outer circumferential surface of the conductive support 1, and the conductive resin layer 3 is formed on the outer circumferential surface of the conductive elastic layer 2.

The formation method of the conductive elastic layer 2 is not limited to an injection molding method, and a cast molding method, or a method in which press molding and grinding are combined together may be adopted. In addition, according to some examples, a method of coating the coating liquid on the conductive resin layer may include a dipping method, a spray coating method, a roller coating method, and/or the like.

Various examples of the charging roller 10 will be described.

Example 1-1 to Example 1-18 and Comparative Examples 1-1 to 1-4

Preparation of Material for Forming Conductive Elastic Layer

A material for forming a conductive elastic layer was prepared by compounding and kneading with a roller the following: 100.00 parts by mass of epichlorohydrin rubber ("EPICHLOMER CG-102", manufactured by DAISO CHEMICAL CO., LTD.) as a rubber component, 5.00 parts by mass of sorbitan fatty acid ester ("SPLENDER R-300", manufactured by Kao Corporation) as a lubricant, 5.00 parts by mass of a ricinoleic acid as a softener, 0.50 part by mass of a hydrotalcites compound ("DHT-4A", manufactured by Kyowa Chemical Industry Co., Ltd.) as an acid acceptor, 1.00 part by mass of tetrabutyl ammonium chloride ("tetrabutyl ammonium chloride", manufactured by Tokyo Chemical Industry Co., Ltd.) as a conductive agent (an ion conductive agent), 50.00 parts by mass of silica ("Nipsil ER", manufactured by Tosoh Silica Corporation) as a filler, 5.00 parts by mass of zinc oxide as a cross-linking promoter, 1.50 parts by mass of dibenzothiazole sulfide, 0.50 part by mass of tetramethyl thiuram monosulfide, and 1.05 parts by mass of sulfur as a cross-linking agent.

Preparation of Coating Liquid for Forming Conductive Resin Layer

The following were added to tetrahydrofuran (THF), and stirred until the solution became uniform: 100.00 parts by mass of thermoplastic N-methoxy methylated 6-nylon ("Toresin F-30K", manufactured by Nagase ChemteX Corporation) as a polymer component, 5.00 parts by mass of methylene bisethyl methyl aniline ("CUREHARD-MED", manufactured by Ihara Chemical Industry Co., Ltd.) as a curing agent, and 18.00 parts by mass of carbon black ("Denka Black HS100", manufactured by Denka Company Limited) as a conductive agent (an electroconductive agent) were mixed. In such a mixed liquid, polyrotaxane ("SeRM Micro Ball (an average particle diameter of 20 μm)", manufactured by Advanced Softmaterials Inc.), and two types of amorphous nylon resin particles having different average particle diameters ("Orgasol Series", manufactured by Arkema S.A.) as the first particles 31 and the second particles 32. In addition, an additive amount was adjusted such that the content of polyrotaxane in the conductive resin layer 3 was the amount (mass %) shown in Table 1, the content of the first particles 31 was 30 mass %, and the content of the second particles 32 was 35 mass %. Each component in the solution was dispersed by using a double roll. Accordingly, a coating liquid for forming a conductive resin layer was prepared.

In each of the examples and each of the comparative examples, the average particle diameter and the content of the first particles 31 and the second particles 32 were adjusted, and thus, the ten-point average roughness Rzjis of the surface of the roller body 5 to be obtained was adjusted to the values shown in Table 1. The average particle diameter of the first particles 31 and the second particles 32 was measured as follows. 100 particles were randomly extracted from a population of a plurality of particles with SEM observation, and an average value of particle diameters was determined and set as the average particle diameter of the resin particles. The resin particles used had an amorphous shape, and therefore, the particle diameter of each particle extracted was determined based on an average value of the longest cross-sectional distance (longest diameter) and the shortest cross-sectional distance (shortest diameter) of the observed particle.

Preparation of Charging Roller

A roller mold including a cylindrical roller molding space was prepared, and a core bar having a diameter of 8 mm (the conductive support 1) was set to extend coaxially with the roller molding space. The material for forming a conductive elastic layer prepared as described above was injected into the roller molding space in which the core bar was set. The material was heated to 170° C. for 30 minutes, and then, cooled, and then demolded, to obtain the conductive elastic layer 2 having a thickness of 2 mm (a thickness in the central position along the rotation axis line L direction) formed along the outer circumferential surface of the conductive support 1 as a conductive axle body. Subsequently, the end portion of the conductive elastic layer 2 was cut, and thus, the length of the conductive elastic layer 2 was adjusted to 320 mm.

Subsequently, the coating liquid for forming a conductive resin layer prepared as described above was applied onto the surface of the conductive elastic layer 2 of a roller body by a roller coating method. At this time, the coating was performed while an unnecessary coating liquid was scraped with a scraper to obtain a desired film thickness. After a coated film was formed, the film was heated at 150° C. for 30 minutes, to form the conductive resin layer 3 having a layer thickness A of 4.0 μm. Accordingly, the charging roller 10 including the axle body (the conductive support 1), the conductive elastic layer 2 formed along the outer circumferential surface of the axle body, and the conductive resin layer 3 formed along the outer circumferential surface of the conductive elastic layer 2 was formed. Furthermore, the crown amount of the roller body 5 was 70 μm.

Example 2-1 to Example 2-18 and Comparative Examples 2-1 to 2-4

The charging roller 10 was prepared similarly to Example 1-1, with some differences. For example, the crown amount of the roller body 5 was set to 90 μm, the content of the polyrotaxane and the ten-point average roughness Rzjis of the surface of the roller body 5 were set as shown in Table 2.

Example 3-1 to Example 3-18 and Comparative Examples 3-1 to 3-4

The charging roller 10 was prepared similarly to Example 1-1, with some differences. For example, the crown amount of the roller body 5 was set to 100 μm, and the content of the polyrotaxane and the ten-point average roughness Rzjis of the surface of the roller body 5 were set as shown in Table 3.

Evaluations

The following evaluations were performed with respect to the obtained charging rollers 10. Evaluation results are shown in Tables 1 to 3.

a) Ten-Point Average Roughness Rzjis of Surface of Roller Body 5

The ten-point average roughness Rzjis was measured by using a surface roughness indicator SE-3400 manufactured by Kosaka Laboratory Ltd., and by setting a cut-off value to 0.8 mm, a measurement speed to 0.5 mm/s, and a measurement length to 8 mm, in accordance with a method based on JIS B0601-2001. By this indicator, six random spots (or positions) on the surface of the roller body 5 were measured, and an average value of the six spots was set as each measurement value.

b) Evaluation of FFT Amplitude

Figure 3:
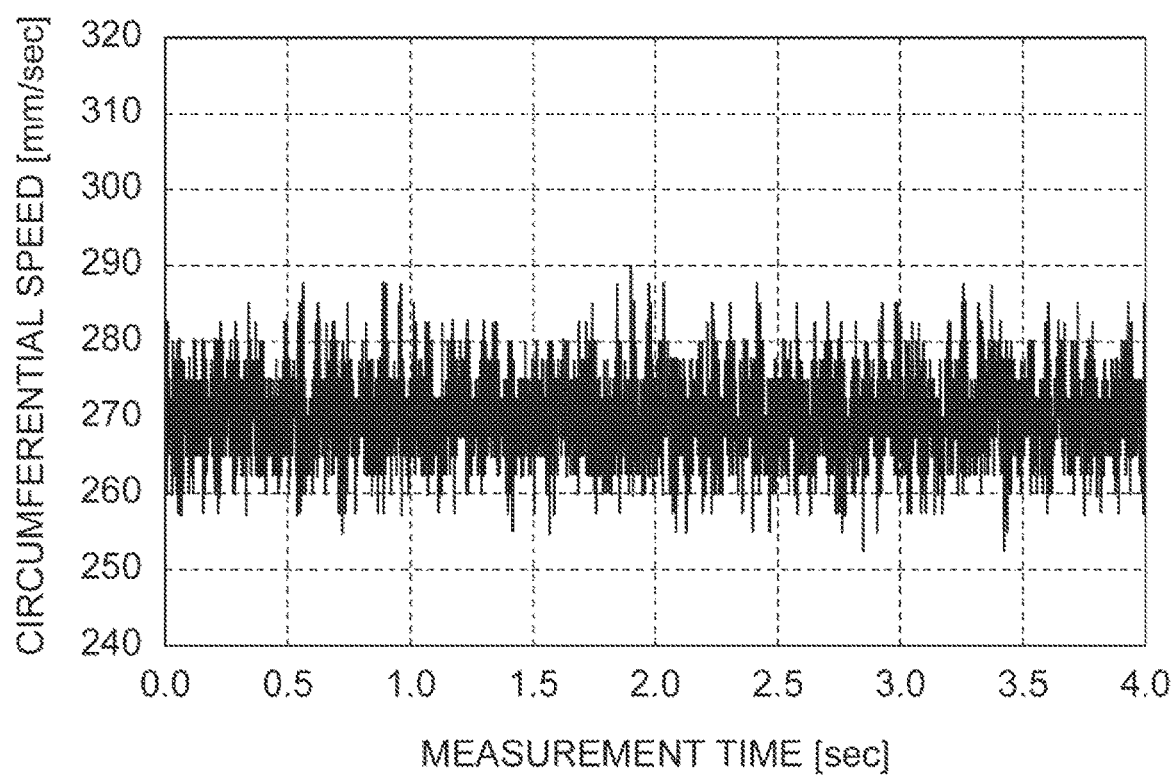
FIG. 3 is a graph of a measurement result of a circumferential speed of the example charging roller.

The charging roller 10 was attached to a photoreceptor unit (or device), the photoreceptor unit was set in an empty rotation jig, and the number of rotations of the photoreceptor was set to 280 mm/sec. A circumferential speed of the charging roller 10 to rotate at the time of being driven, was measured by using a laser Doppler velocimeter (LDV) manufactured by Canon Inc. An optical sensor S-100Z (Measurement Distance: 40 mm and Measurement Depth: ±5 mm) was connected to a signal processing unit (signal processing device) and a computer (PC), and measured the circumferential speed of the charging roller 10 by using software (Velocity and Length Testing software). Accordingly, a waveform of the circumferential speed of the charging roller 10 as illustrated in FIG. 3 may be obtained.

Figure 4:
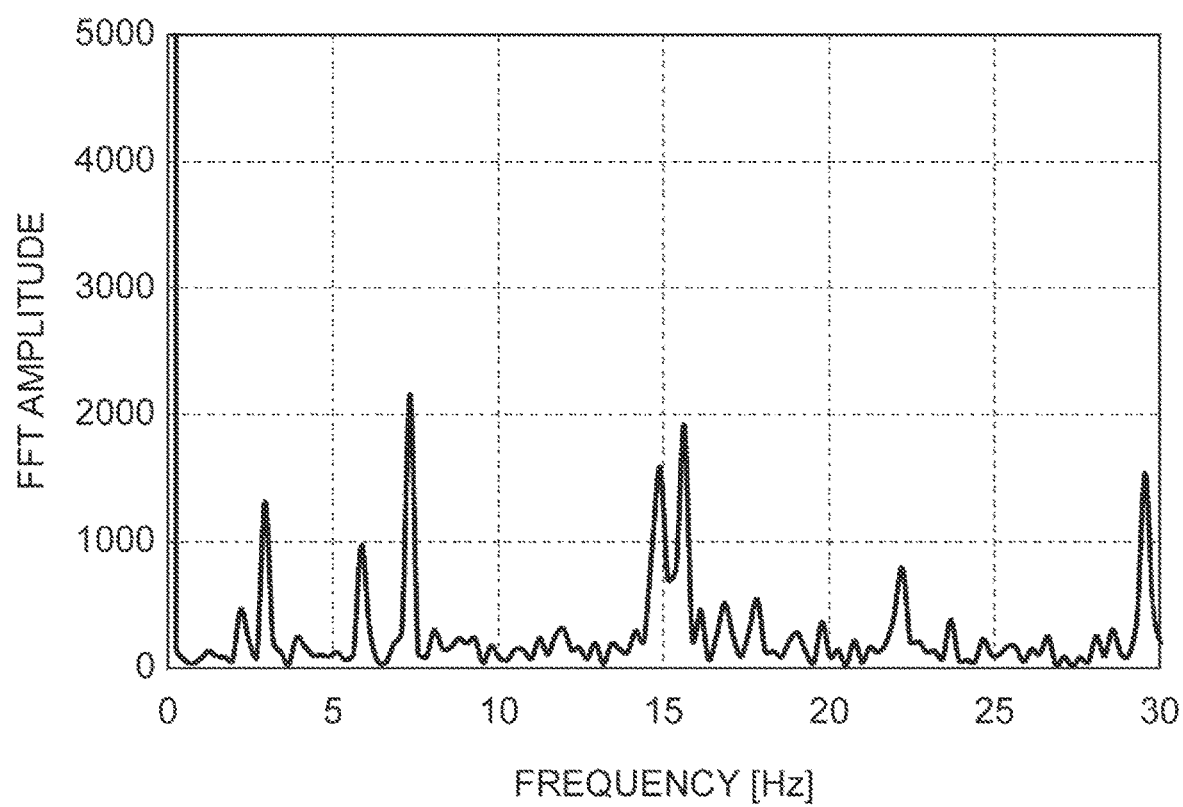
FIG. 4 is a graph an FFT amplitude with respect to a rotational frequency of the example charging roller.

Subsequently, a Fast Fourier Transform (FFT) was performed with respect to the obtained waveform of the circumferential speed. Accordingly, for example, an FFT amplitude for each frequency of the charging roller 10 as illustrated in FIG. 4 may be obtained. From the FFT amplitude, an FFT amplitude at a rotational frequency of 7.32 Hz of the charging roller 10 that was actually measured (based on the calculation: 280 [mm/sec]/Charging Member Outer Diameter (φ12 mm)×π=7.42 Hz) was obtained. The FFT amplitude is one of indices for evaluating the rotation unevenness (the circumferential speed deviation) of the charging roller 10.

c) Microjitter Evaluation

Multixpress MX7 Series X7600GX manufactured by SAMSUNG, was used as an image forming device. The charging roller obtained as described above was built into the image forming device, and a halftone image was output in accordance with the following conditions.

Printing Environment: 23° C./60% RH.

Printing Condition: General Printing Speed of 280 mm/sec and Half Speed thereof, Number of Printed Sheets (Two Points of 180 kPV and 360 kPV), Type of Sheet (Office Paper EC).

Applied Bias: Suitably adjusted and Determined such that Photoreceptor Surface Potential Becomes −600 V.

Microjitter appearing in the obtained image was visually observed, and was evaluated based on the following standards. Furthermore, the microjitter is one of indices for evaluating the charging evenness.

Evaluation A: A uniform halftone image was obtained.

Evaluation B: A slight charging unevenness occurred in the image end portion.

Evaluation C: An obvious charging unevenness occurred in the image end portion.

Evaluation D: A charging unevenness occurred in the entire image.

d) Evaluation of Roughness

As with c) described above, a halftone image was output, and roughness appearing in the obtained image was visually observed, and was evaluated based on the following standards. Furthermore, the roughness is one of indices for evaluating the image quality.

Evaluation A: A smooth image was obtained.

Evaluation B: A slight roughness occurred in the image end portion.

Evaluation C: An obvious roughness occurred in the image end portion.

Evaluation D: A roughness occurred in the entire image.

e) Evaluation of Surface Contamination

Surface contamination of the charging roller 10 at the time of performing an endurance test (a temperature of 23° C., humidity of 50% RH, and an image concentration of 5%) was evaluated. The surface contamination of the charging roller 10 was mainly derived from toner silica of an external additive that is used in the toner, and thus, the degree of contamination was evaluated by quantifying an element Si on the surface of the charging roller 10 with a fluorescence X-ray measurement device (EDXL300: manufactured by Rigaku Corporation). Specifically, in a chamber of the fluorescence X-ray measurement device, the charging roller 10 was arranged such that the center of the charging roller 10 was aligned with a detector, and the element Si on the surface of the charging roller 10 was quantified. Such measurement was performed with respect to each of the charging roller 10 before the endurance test and the charging roller 10 after the endurance test, and thus, a difference ΔSi [cps/mA] in the amount of Si before and after the endurance test (=Amount of Si [cps/mA] after Endurance Test−Amount of Si [cps/mA] before Endurance Test) was obtained. The surface contamination of the charging roller 10 was evaluated based on the following standards by using ΔSi as an index.

Evaluation A: ΔSi<1000 [cps/mA]

Evaluation B: 1000 [cps/mA]≤ΔSi<2000 [cps/mA]

Evaluation C: 2000 [cps/mA]≤ΔSi<3000 [cps/mA]

Evaluation D: 3000 [cps/mA]≤ΔSi

TABLE 1

| Examples | Rzjis (μm) | Content (mass %) of polyrotaxane | Crown amount (μm) | FFT amplitude | Microjitter | Roughness | Surface contamination |
|---|---|---|---|---|---|---|---|
| Comparative 1-1 | 17.5 | 0.0 | 70 | 1525 | D | D | A |
| Comparative 1-2 | 17.5 | 7.0 | 70 | 1067 | D | A | A |
| 1-1 | 20.0 | 1.0 | 70 | 1567 | C | C | B |
| 1-2 | 20.0 | 3.0 | 70 | 1427 | C | A | B |
| 1-3 | 20.0 | 6.0 | 70 | 1216 | C | A | B |
| 1-4 | 21.5 | 2.0 | 70 | 1559 | B | B | B |
| 1-5 | 21.5 | 6.0 | 70 | 1216 | B | A | B |
| 1-6 | 23.0 | 3.0 | 70 | 1544 | A | C | B |
| 1-7 | 23.0 | 4.0 | 70 | 1468 | A | A | B |
| 1-8 | 23.0 | 6.0 | 70 | 1316 | A | A | B |
| 1-9 | 23.0 | 8.0 | 70 | 1164 | A | A | C |
| 1-10 | 26.0 | 4.0 | 70 | 1580 | A | C | B |
| 1-11 | 26.0 | 6.0 | 70 | 1417 | A | A | B |
| 1-12 | 26.0 | 7.0 | 70 | 1335 | A | A | B |
| 1-13 | 26.0 | 9.0 | 70 | 1171 | A | A | C |
| 1-14 | 27.5 | 6.0 | 70 | 1467 | A | B | B |
| 1-15 | 27.5 | 8.0 | 70 | 1297 | A | A | C |
| 1-16 | 30.0 | 6.0 | 70 | 1550 | A | C | B |
| 1-17 | 30.0 | 8.0 | 70 | 1317 | A | A | C |
| 1-18 | 30.0 | 10.0 | 70 | 1192 | A | A | C |
| Comparative 1-3 | 32.5 | 6.0 | 70 | 1624 | A | D | A |
| Comparative 1-4 | 32.5 | 14.0 | 70 | 1067 | A | A | D |

TABLE 2

| Examples | Rzjis (μm) | Content (mass %) of polyrotaxane | Crown amount (μm) | FFT amplitude | Microjitter | Roughness | Surface contamination |
|---|---|---|---|---|---|---|---|
| Comparative 2-1 | 17.5 | 2.0 | 90 | 1674 | D | D | A |
| Comparative 2-2 | 17.5 | 9.0 | 90 | 1425 | D | A | B |
| 2-1 | 20.0 | 3.0 | 90 | 1653 | C | C | A |

TABLE 2-continued

| Examples | Rzjis (μm) | Content (mass %) of polyrotaxane | Crown amount (μm) | FFT amplitude | Microjitter | Roughness | Surface contamination |
|---|---|---|---|---|---|---|---|
| 2-2 | 20.0 | 6.0 | 90 | 1419 | C | A | A |
| 2-3 | 20.0 | 8.0 | 90 | 1262 | C | A | B |
| 2-4 | 21.5 | 4.0 | 90 | 1606 | B | B | A |
| 2-5 | 21.5 | 7.0 | 90 | 1367 | B | A | A |
| 2-6 | 23.0 | 4.0 | 90 | 1638 | A | C | A |
| 2-7 | 23.0 | 5.0 | 90 | 1556 | A | B | A |
| 2-8 | 23.0 | 7.0 | 90 | 1394 | A | A | A |
| 2-9 | 23.0 | 9.0 | 90 | 1234 | A | A | B |
| 2-10 | 26.0 | 6.0 | 90 | 1531 | A | B | A |
| 2-11 | 26.0 | 7.0 | 90 | 1447 | A | A | A |
| 2-12 | 26.0 | 9.0 | 90 | 1278 | A | A | B |
| 2-13 | 27.5 | 5.0 | 90 | 1616 | A | C | A |
| 2-14 | 27.5 | 6.0 | 90 | 1560 | A | B | A |
| 2-15 | 27.5 | 8.0 | 90 | 1388 | A | A | B |
| 2-16 | 30.0 | 6.0 | 90 | 1607 | A | C | A |
| 2-17 | 30.0 | 8.0 | 90 | 1430 | A | A | B |
| 2-18 | 30.0 | 10.0 | 90 | 1253 | A | A | C |
| Comparative 2-3 | 32.5 | 5.0 | 90 | 1745 | A | D | A |
| Comparative 2-4 | 32.5 | 12.0 | 90 | 1198 | A | A | D |

TABLE 3

| Examples | Rzjis (μm) | Content (mass %) of polyrotaxane | Crown amount (μm) | FFT amplitude | Microjitter | Roughness | Surface contamination |
|---|---|---|---|---|---|---|---|
| Comparative 3-1 | 17.5 | 4.0 | 110 | 1854 | D | D | A |
| Comparative 3-2 | 17.5 | 12.0 | 110 | 1249 | D | A | D |
| 3-1 | 20.0 | 5.0 | 110 | 1768 | C | C | A |
| 3-2 | 20.0 | 8.0 | 110 | 1508 | C | A | B |
| 3-3 | 20.0 | 10.0 | 110 | 1335 | C | A | C |
| 3-4 | 21.5 | 6.0 | 110 | 1681 | B | B | A |
| 3-5 | 21.5 | 9.0 | 110 | 1422 | B | A | B |
| 3-6 | 23.0 | 6.0 | 110 | 1681 | A | C | A |
| 3-7 | 23.0 | 7.0 | 110 | 1595 | A | B | A |
| 3-8 | 23.0 | 8.0 | 110 | 1508 | A | A | B |
| 3-9 | 23.0 | 10.0 | 110 | 1335 | A | A | C |
| 3-10 | 26.0 | 7.0 | 110 | 1595 | A | B | A |
| 3-11 | 26.0 | 8.0 | 110 | 1508 | A | A | B |
| 3-12 | 26.0 | 10.0 | 110 | 1335 | A | A | C |
| 3-13 | 27.5 | 6.0 | 110 | 1681 | A | C | A |
| 3-14 | 27.5 | 7.0 | 110 | 1595 | A | B | A |
| 3-15 | 27.5 | 9.0 | 110 | 1422 | A | A | B |
| 3-16 | 30.0 | 7.0 | 110 | 1595 | A | C | A |
| 3-17 | 30.0 | 8.0 | 110 | 1508 | A | A | B |
| 3-18 | 30.0 | 10.0 | 110 | 1335 | A | A | C |
| Comparative 3-3 | 32.5 | 6.0 | 110 | 1681 | A | D | A |
| Comparative 3-4 | 32.5 | 12.0 | 110 | 1249 | A | A | D |

According to examples, the charging roller 10 is capable of suppressing or inhibiting the rotation unevenness (the circumferential speed deviation) and the charging unevenness. In addition, according to examples of the charging roller 10, it is possible to suppress or inhibit an image roughness in the image to be obtained and to reduce or inhibit the surface contamination of the conductive resin layer 3.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. A charging roller comprising:
    a conductive support; and
    a roller body to rotate about the conductive support, wherein the roller body includes:
        a conductive elastic layer to contact the conductive support, and
        a conductive resin layer located around the conductive elastic layer to form a surface of the roller body,
    wherein the surface has ten-point average roughness of approximately 20 μm to 30 μm, and wherein the conductive resin layer comprises polyrotaxane.

2. The charging roller according to claim 1, wherein the ten-point average roughness Rzjis is of approximately 23 μm or more.

3. The charging roller according to claim 1, wherein a content of the polyrotaxane in the conductive resin layer is of approximately 1 mass % or more.

4. The charging roller according to claim 1, wherein a content of the polyrotaxane in the conductive resin layer is of approximately 10 mass % or more.

5. The charging roller according to claim 1, wherein a crown amount of the roller body is of approximately 50 μm or more.

6. The charging roller according to claim 1, wherein a crown amount of the roller body is of approximately 130 μm or more.

7. The charging roller according to claim 1, wherein a crown amount of the roller body is of approximately 60 μm to 80 μm.

8. The charging roller according to claim 7, wherein a content (mass %) of the polyrotaxane in the conductive resin layer divided by the ten-point average roughness (μm) raised to the power of 2, is equal to or greater than approximately 0.007.

9. The charging roller according to claim 1, wherein a crown amount of the roller body is of approximately 80 μm to 100 μm.

10. The charging roller according to claim 9, wherein a content (mass %) of the polyrotaxane in the conductive resin layer divided by the ten-point average roughness (μm) is equal to or greater than approximately 0.25.

11. The charging roller according to claim 1, wherein a crown amount of the roller body is of approximately 100 μm to 120 μm.

12. The charging roller according to claim 11, wherein a content of the polyrotaxane in the conductive resin layer is of approximately 8 mass % or more.

13. The charging roller according to claim 1, wherein the conductive resin layer comprises a base polymer and particles.

14. The charging roller according to claim 13, wherein the particles include first particles selected from the group consisting of first resin particles and first inorganic particles, and second particles selected from the group consisting of second resin particles and second inorganic particles.

15. An image forming device comprising:
a photoreceptor; and
a charging roller to charge the photoreceptor, wherein the charging roller includes:
a conductive support, and
a roller body to rotate about the conductive support, wherein the roller body includes:
a conductive elastic layer to contact the conductive support, and
a conductive resin layer located around the conductive elastic layer to form a surface of the roller body,
wherein the surface has ten-point average roughness of approximately 20 μm to 30 μm, and wherein the conductive resin layer comprises polyrotaxane.

* * * * *